United States Patent [19]

Gruening

[11] Patent Number: 5,190,580
[45] Date of Patent: Mar. 2, 1993

[54] PROCESS OF USING BIOCIDAL COMPOSITIONS

[75] Inventor: Rainer Gruening, Basking Ridge, N.J.

[73] Assignee: Troy Chemical Corporation, Newark, N.J.

[21] Appl. No.: 782,624

[22] Filed: Oct. 25, 1991

Related U.S. Application Data

[62] Division of Ser. No. 467,404, Jan. 22, 1990, Pat. No. 5,071,479.

[51] Int. Cl.$^5$ .............................................. C09D 5/16
[52] U.S. Cl. ............................ 106/18.32; 106/15.05; 106/16; 106/17; 106/18; 106/18.31; 106/18.34; 106/18.35; 514/493; 523/122; 524/178; 524/180
[58] Field of Search ................... 106/18.32, 15.05, 16, 106/17, 18, 18.31, 18.34, 18.35; 514/493; 523/122; 524/178, 180; 71/67

[56] References Cited

U.S. PATENT DOCUMENTS

| | | | |
|---|---|---|---|
| 2,957,785 | 10/1960 | Leatherland | 428/289 |
| 3,167,473 | 1/1965 | Leebrick | 523/122 |
| 3,923,870 | 12/1975 | Singer | 560/24 |
| 4,021,392 | 5/1977 | Milne et al. | 523/177 |
| 4,127,687 | 11/1978 | Dupont | 428/35 |
| 4,174,339 | 11/1979 | Matsuda et al. | 106/15.05 |
| 4,191,579 | 3/1980 | Hails et al. | 106/15.05 |
| 4,276,211 | 6/1981 | Singer et al. | 106/18.32 |
| 4,407,997 | 10/1983 | Sghibartz | 524/202 |
| 4,426,464 | 1/1984 | Sghibartz | 523/122 |
| 4,437,892 | 3/1984 | Kelsey | 106/15.05 |
| 4,475,941 | 10/1984 | Ayglon et al. | 71/67 |
| 4,482,652 | 11/1984 | Datta | 523/122 |
| 4,485,197 | 11/1984 | Yokoi et al. | 523/177 |
| 4,552,885 | 11/1985 | Gabriele et al. | 514/316 |

FOREIGN PATENT DOCUMENTS

| | | |
|---|---|---|
| 917629 | 2/1963 | United Kingdom . |
| 1058701 | 2/1967 | United Kingdom . |
| 1294474 | 10/1972 | United Kingdom . |
| 1457590 | 12/1976 | United Kingdom . |
| 2138292 | 10/1984 | United Kingdom . |
| 2140299 | 11/1984 | United Kingdom . |

OTHER PUBLICATIONS

Bleile, H. R., et al., Marine Coatings, Federation of Societies for Coatings Technology, pp. 14–15 (Mar. 1989).

Clark, E. A., et al., Environ. Sci. Technol., "The Fate of Tributyltin in the Aquatic Environment," vol. 22, No. 6 (1988).

Primary Examiner—Karl Group
Assistant Examiner—Anthony J. Green
Attorney, Agent, or Firm—Banner, Birch, McKie & Beckett

[57] ABSTRACT

A synergistic composition of biocides for the preparation of anti-fouling paint preferably containing at least one of the group of 3-iodo-2-propynyl-butyl carbamate, 3-iodo-2-propynyl-cyclohexyl carbamate, 3-iodo-2-propynyl phenyl carbamate, 3-iodo-2-propynylbenzyl carbamate, 3-iodo-2-propynyl propyl carbamate and 4-iodo-3-butynyl propyl carbamate and at least one of the group of tributyltin compounds consisting of bis(tributyltin) oxide, tributyltin fluoride, tributyltin methacrylate, tributyltin phosphate and tributyltin naphthenate. Said composition is more effective in protecting ship bottoms or underwater constructions than each component itself.

3 Claims, No Drawings

PROCESS OF USING BIOCIDAL COMPOSITIONS

This application is a division of application Ser. No. 07/467,404, filed Jan. 22, 1990, now U.S. Pat. No. 5,071,479.

BACKGROUND OF THE INVENTION

1. Field of the Invention

The present invention relates to biocidal compositions, particularly those containing a synergistic mixture of carbamate and organotin biocides useful for protecting materials exposed to an aquatic environment. This invention especially relates to the prevention and inhibition of fouling of marine structures such as boat, ship, or other vessel hulls, pilings, oil well drilling towers, and the like by organisms commonly found in sea water.

In a preferred embodiment, the present invention relates to a biocidal composition containing a synergistic mixture of carbamate and tributyltin biocides. In this preferred embodiment, a marine structure is treated by coating the surface thereof with a paint containing an organic binder and a biocidally effective amount of the mixture of (1) the carbamate compound, such as one selected from the group consisting of 3-iodo-2-propynyl propyl carbamate, 3-iodo-2-propynyl butyl carbamate, 3-iodo-2-propynyl hexyl carbamate, 3-iodo-2-propynyl cyclohexyl carbamate, 3-iodo-2-propynyl phenyl carbamate, 3-iodo-2-propynyl benzyl carbamate, 4-iodo-3-butynyl propyl carbamate and mixtures thereof, and (2) the tributytin compound, such as one selected from the group consisting of bis(tributyltin) oxide, tributyltin fluoride, tributyltin methacrylate, tributyltin phosphate and tributyltin naphthenate, and mixtures thereof. In another embodiment, a marine structure is treated by coating its surface with a composition containing a biocidally effective amount of either 3-iodo-2-propynyl propyl carbamate or 4-iodo-3-butynyl propyl carbamate or a mixture thereof.

2. Description of Related Art

Singer U.S. Pat. No. 3,923,870 describes urethanes of 1-halogen-substituted alkynes and their fungicidal activity. The compound 3-iodo-2-propynyl butyl carbamate (IPBC) (CAS 55406-53-6) described in U.S. Pat. No. 3,923,870 is widely used as a fungicide for aqueous and organic solvent based systems such as paints and coatings, metal cutting fluids, textile and paper coatings, inks, plastics, adhesives and the like. Research indicates that IPBC has a promising efficacy profile against wood destroying organisms (fungi), having shown low toxic values for common fungi. Indeed, a unique characteristic of IPBC is its efficacy against both blue stain (ascomycetes) and general wood destroying fungi (basidiomycetes) at a reasonable application rate. IPBC is also known as an algicide for use in fresh water and marine applications, see U.K. Patent 2,138,292.

It also is known that organic tin compounds such as those of the general formula:

where $R^4$ is selected from $(CH_3CH_2CH_2CH_2)_3SnO$, fluoride, chloride, phosphate, acrylate methacrylate, naphthenate, hydroxide, octoate, phthalate, sulfate, maleate, fumarate, laureate, linoleate, abietate, ethanesulphonate, and the like can be used in paints to provide anti-fouling property to coatings applied to ship hulls to prevent fouling by algae and other marine organisms (pests).

The prior art, however, does not provide any indication whether the combination of the fungicide IPBC or other related carbamate fungicides with an organic tin compound such as one or more of the above-mentioned tributyltin-type compounds would be useful for anti-fouling coatings for protecting materials exposed to an aquatic (e.g. marine) environment, such as ship hulls and other underwater constructions.

The growth of marine organisms on the submerged parts of a ship's hull increases the frictional resistance of the hull to passage through water, leading to increased fuel consumption and/or a reduction in the speed of the ship. Marine growths accumulate so rapidly that the remedy of cleaning and repainting as required in drydock is generally considered too expensive. An alternative which has been practiced with increasing efficiency over the years, is to limit the extent of fouling by applying to the hull a top coat paint incorporating anti-fouling agents. The anti-fouling agents are biocides which are feed from the surface of the paint over a period of time at a concentration lethal to marine organisms at the hull surface. The anti-fouling paint fails only when the concentration of biocide available at the paint surface falls below the lethal concentration and with modern paints up to two years of useful life is expected.

There are marked distinctions between the requirements for biocides in different environments, such as antifungal agents in house paints, fresh water algicides, and antifouling agents for marine structures exposed to sea water flora and fauna. As is known, the mildew or fungus which grows on house paints and the like, utilizes the paint medium as a nutrient, or in some cases, the underlying substrate, such as wood, as the nutrient. The mycelia and fruiting bodies of the fungi contact or penetrate the paint film and thus, through intimate contact with any fungicides in the film (to a large extent regardless of whether the fungicides are highly soluble, slightly soluble, or insoluble in water), the fungi are destroyed. In cooling towers utilizing fresh water, slime and algae may develop if effective compounds for combatting their growth are not present. In the case of cooling tower water, the compound should be highly soluble. In paints such as exterior house paints, undergoing normal exposure to weather, the solubility of the compound is not as critical since the paint film is only sporadically exposed to liquid water.

While IPBC and related carbamate compounds are known to exhibit good fungicidal and algicidal activity, it is not known whether these fungicides could also be used in anti-fouling coatings in combination with known organic tin compounds, particularly tributyltin-type compounds, to prevent the growth of marine organisms like algae, barnacles, encrusting bryozoan, tunicates, hydroids, adherent slime or other higher developed crustaceas on submerged surfaces. Results obtained with anti-fouling paints when utilizing IPBC and related compounds are not predictable from their effectiveness as general biocides, whether against bacteria, fungi, insects, etc. It also is not known if or how long the combination would retain its efficacy as an anti-fouling biocide formulation or whether it might even be superior in overall performance as an anti-fouling compound in comparison to the iodopropynyl carbamate-related compounds or the tributyltin-related compounds by themselves.

Additionally, it is not known how the combination of one or more members from each group of these compounds would affect their overall biocidal (anti-fouling) activity, for example, if used in paint to protect ship hulls from the growth of marine organisms. As is always a possibility when using a combination of chemicals having diverse activities, one of the chemicals may impair or interfere with the activity of the other.

From the foregoing, it is apparent that the effectiveness of biocidal materials useful in combatting fungi, insects, bacteria, and the like in non-aqueous media, and biocides effective in combatting fungi, slime, and algae in fresh water systems, cannot be used to predict the effectiveness of these compounds as anti-fouling agents in sea water and brackish water capable of supporting marine life such as barnacles, slime, hydroids, "grassy" brown felt algae and the like.

Since the prior art has not disclosed or suggested combining IPBC or its related carbamate compounds with organic tin compounds, and especially the above-mentioned tributyltin-type biocides, the prior art does not indicate what amounts of the fungicide IPBC (and its related carbamate compounds) and of the organic tin compound, such as one or more of the above-noted tributyltin-type biocides, are required to provide an optimum in anti-fouling application against algae and higher developed marine organisms. For similar reasons, it is not known what amounts of IPBC (and its related carbamate compounds) and of the organic tin compound are needed to obtain the long-lasting efficacy needed for successful anti-foulant, marine applications, or how to formulate an effective anti-foulant composition using this biocide combination.

In this regard, there is a growing concern about the environmental effects caused by using the organic tin biocides at their present commercial levels as an anti-foulant active ingredient in coating compositions for aquatic (marine) applications. It has been shown that, due to the wide-spread use of tributyltin-type compounds in particular, at concentrations as high as 20 wt. % in paints for ship bottoms, the pollution of surrounding water due to leaching has reached such a level as to cause the degradation of mussel and shell organisms. These effects have been detected along the French-British coastline and a similar effect has been confirmed in U.S. and Far East waters. Under the most recent regulatory restrictions, with limited exceptions, pleasure boats up to 25 meters long are no longer permitted to use anti-foulant paint containing high levels of tributyltin compounds.

Research has shown that as long as the leaching rate of tin can be maintained at or below about 4 ug/cm$^2$ per day, aquatic life does not appear to be affected over the long term. However, it has also been found that to be effective for controlling marine algae, as well as higher developed marine organisms, from the painted surface of ship bottoms, a certain minimum leaching rate of tin of about 9 to 16 ug/cm$^2$/day is required. Usually, this higher leaching rate is achieved with a concentration of tributyltin compound at about 15% to 20% by weight of paint.

Obviously, these two requirements are at odds. Authorities have reluctantly agreed that as long as there is no satisfactory substitute for the anti-foulant organic tin active ingredients, larger ships, i.e., those above a length of 25 meters, are still permitted to use such compounds to minimize fouling. As an indication of the importance of new solutions to this age old problem, the EPA has agreed to certify within 90 days new anti-foulant paints meeting the requirements of acceptable release rates.

DISCLOSURE OF THE INVENTION

In a first aspect, the present invention provides a composition useful, for example as a coating, for the long-term protection of materials exposed to an aquatic (marine) environment. The composition comprises a mixture of (i) an iodoalkynyl carbamate of the formula

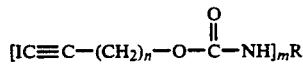

in which m is 1, 2 or 3; n is 1, 2 or 3; and R is hydrogen, an unsubstituted or substituted alkyl, aryl, aralkyl, alkaryl, alkenyl, cycloalkyl or cycloalkenyl, or an alkoxy aryl all having from 1 to not more than 20 carbon atoms and m and n may be the same or different and (ii) an organic trihydrocarbyl tin compound of the formula

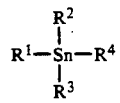

where R$^1$, R$^2$ and R$^3$ can each be an alkyl or cycloalkyl having from 1 to 6 carbon atoms or an aryl, aralkyl or alkaryl having from 6 to 12 carbon atoms and R$^4$ is selected from (CH$_3$CH$_2$CH$_2$CH$_2$)$_3$SnO, fluoride, chloride, phosphate, methacryate, naphthenate, hydroxide, octoate, phthalate, sulfate, laureate, linoleate, abietate, and ethanesulphonate. The composition is particularly useful in anti-fouling paint and is effective for combatting fouling organisms common in sea water and brackish water, the organisms including weeds (algae), slime, brown felt algae, hydroids, barnacles, encrusting bryozoan, tunicates, hydroids, adherent slime and the like.

It has been found that a combination of one or more from the group of 3-iodo-2-propynyl butyl carbamate (IPBC), 3-iodo-2-propynyl hexyl carbamate (IPHC), 3-iodo-2-propynyl cyclohexyl carbamate (IPCC), 3-iodo-2-propynyl phenyl carbamate (IPPhC), 3-iodo-2-propynyl benzyl carbamate (IP benzyl C), 3-iodo-2-propynyl propyl carbamate (IPPC), 4-iodo-3-butynyl propyl carbamate (IBPC) and/or other related derivatives with one or more of the tributyltin compounds represented by the formula:

where R$^4$ is selected from (CH$_3$CH$_2$CH$_2$CH$_2$)$_3$SnO, fluoride, chloride, phosphate, methacryate, naphthenate, hydroxide, octoate, phthalate, sulfate, laureate, linoleate, abietate, and ethanesulphonate provides a composition having superior anti-foulant performance. It has been discovered that with this combination of ingredients, the total amount of active ingredients needed to provide satisfactory performance is lower in comparison to the amount of the individually applied compounds required to provide a similar anti-fouling protection. In other words, the combination of the carbamate and trihydrocarbyl tin compounds provides a synergistic result relative to the use of either individually.

In another aspect, the present invention provides a method of controlling fouling of an underwater surface of a marine structure by marine pests which comprises applying a coating of a paint to the surface, the paint containing a biocidally effective amount of a mixture of at least one of the above-identified iodoalkynyl carbamates and at least one of the above-identified organic trihydrocarbyl tin compounds.

In an alternative aspect, the method of controlling fouling employs a paint containing a biocidally effective amount of 3-iodo-2-propynyl propyl carbamate or 4-iodo-3-butynyl propyl carbamate or a mixture thereof.

In accordance with the present invention, a biocidal composition is provided which is useful for protecting surfaces such as wood and other materials exposed to an aquatic (marine) environment from attack by marine pests. In the first aspect of the invention, the composition contains a mixture of a) at least one iodoalkynyl carbamate compound having a formula:

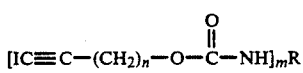

in which m is 1, 2 or 3; n is 1, 2 or 3; and R is hydrogen (H); an unsubstituted or substituted alkyl, aryl, aralkyl alkylaryl, alkenyl, cycloalkyl, or cycloalkenyl or an alkoxy aryl all having from one to not more than 20 carbon atoms, and m and n may be the same or different, and b) at least one trihydrocarbyl tin compound having a formula:

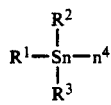

where $R^1$, $R^2$ and $R^3$ can each be an alkyl or cycloalkyl having from 1 to 6 carbon atoms or an aralkyl or alkaryl having from 6 to 12 carbon atoms and $R^4$ is selected from $(CH_3CH_2CH_2CH_2)_3SnO$, fluoride, chloride, phosphate, acrylate, methacrylate, naphthenate, hydroxide, octoate, phthalate, sulfate, maleate, fumarate, laureate, linoleate, abietate, and ethanesulphonate.

Suitable R substituents for the iodoalkynyl carbamate compound include alkyls such as methyl, ethyl, propyl, n-butyl, t-butyl, pentyl (amyl), hexyl, heptyl, octyl, nonyl, decyl, dodecyl, octadecyl, cycloalkyls such as cyclohexyl, aryls, alkaryls and aralkyls such as phenyl, benzyl, tolyl, cumyl, halogenated alkyls and aryls, such as chlorobutyl and chlorophenyl, and alkoxy aryls such as ethoxyphenyl and the like. Thus, suitable carbamate compounds are selected from the group consisting of 3-iodo-2-propynyl butyl carbamate (IPBC), 3-iodo-2-propynyl hexyl carbamate (IPHC), 3-iodo-2-propynyl cyclohexyl carbamate (IPCC), 3-iodo-2-propynyl phenyl carbamate (IPPhC), 3-iodo-2-propynyl benzyl carbamate (IP Benzyl C), 3-iodo-2-propynyl propyl carbamate (IPPC), 4-iodo-3-butynyl propyl carbamate (IBPC), 3-iodo-2-propynyl-4-chloro phenyl carbamate (IPClPhC), 3-iodo-2-propynyl-4-chloro butyl carbamate (IPClBC) and mixtures thereof.

A preferred group of carbamate fungicides for use with the trihydrocarbyl tin compounds is represented by the formula:

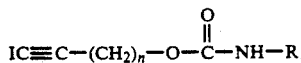

where n is 1 or 2 and R is propyl, butyl, hexyl, cyclohexyl, phenyl or benzyl.

Two iodoalkynyl carbamate compounds, which have surprising efficacy for controlling fouling of marine structures when used alone, when used in combination or when used in admixture with trihydrocarbyl tin compounds are 3-iodo-2-propynyl propyl carbamate (IPPC) and 4-iodo-3-butynyl propyl carbamate (IBPC).

Suitable $R^1$, $R^2$ and $R^3$ substituents for the trihydrocarbyl tin compounds are alkyls such as methyl, ethyl, propyl, butyl, pentyl (amyl) and hexyl, cycloalkyls such as cyclohexyl; aryls, aralkyls, or alkaryls such as phenyl, benzyl and tolyl. These substituents can all be the same, such as tributyl, triphenyl and the like or can be different such as diethylbutyl, diethylamyl, diamylmethyl, diethylphenyl, ethyldiphenyl and the like. Suitable trihydrocarbyl tin compounds include tricyclohexyl-tin chloride, tributyl tin chloride, trimethyl tin chloride and triphenyl tin chloride. Preferred trihydrocarbyl tin compounds are selected from the group of tributyltin compounds consisting of bis (tributyltin) oxide (TBTO), tributyltin fluoride (TBTF), tributyltin methacrylate, tributyltin phosphate, tributyltin naphthenate and mixtures thereof.

Generally, the compositions of the present invention are formulated as paints lacquers, stains, enamels and the like, hereinafter referred to generically as "paint", and will include a liquid vehicle (solvent) for dissolving or suspending the active biocidal ingredients and an organic binder. The vehicle may typically contain at least one of a diluent, an emulsifier and a wetting agent.

Any conventional organic binder may be utilized in marine anti-fouling paint incorporating the biocidal compositions of the present invention and particularly the synergistic anti-foulant mixture of the present invention. Examples of trade-recognized binders are polyvinyl chloride resins in a solvent based system, chlorinated rubbers in a solvent based system, acrylic resins and methacrylate resins in solvent based or aqueous systems, vinyl chloride-vinyl acetate copolymer systems as aqueous dispersions or solvent based systems, butadiene copolymers such as butadiene-styrene rubbers, butadiene-acrylonitrile rubbers, and butadiene-styrene-acrylonitrile rubbers, drying oils such as linseed oil, alkyd resins, asphalt, epoxy resins, urethane resins, polyester resins, phenolic resins and the like.

The paints commonly may contain inorganic pigments, such as titanium dioxide, ferric oxide, silica, talc, or china clay, organic pigments such as carbon black or dyes insoluble in sea water, and may contain materials such as rosin to provide controlled release of the antifoulant, rosin being to a very slight extent soluble in sea water. The paints may contain plasticizers, rheology characteristic modifiers and other conventional ingredients.

In still other aspects of the present invention, the compositions, particularly when formulated as paints, also are provided with other adjuvants conventionally employed in compositions used for protecting materials exposed to an aquatic environment such as additional fungicides, auxiliary solvents, processing additives such as defoamers, fixatives, plasticizers, UV-stabilizers or stability enhancers, water soluble or water insoluble dyes, color pigments, siccatives, corrosion inhibitors, thickeners or antisettlement agents such as carboxymethyl cellulose, polyarcylic acid or polymethacrylic acid, anti-skinning agents and the like. Additional fungicides used in the compositions are preferably soluble in the liquid vehicle.

The synergistic biocidal composition of the present invention generally comprises from about 0.1 to 10 parts by weight, more generally from about 0.2 to 5 parts by weight, and most often from about 0.3 to 4 part by weight of at least one trihydrocarbyl tin compound, preferably one selected from the group consisting of bis(tributyltin) oxide, tributyltin fluoride, tributyltin methacrylate, tributylin phosphate and tributyltin naphthenate, and mixtures thereof per part by weight of the iodoalkynyl carbamate compound, with the carbamate compound preferably being selected from the group consisting of 3-iodo-2-propynyl-butyl carbamate, 3-iodo-2-propynyl hexyl carbamate, 3-iodo-2-propynyl cyclohexyl carbamate, 3-iodo-2-propynyl phenyl carbamate, 3-iodo-2-propynyl benzyl carbamate, 3-iodo-2-propynyl propyl carbamate, 4-iodo-3-butynyl propyl carbamate, 3-iodo-2-propynyl-4-chloro phenyl carbamate, 3-iodo-2-propynyl-4-chloro butyl carbamate and mixtures thereof.

Compositions of the present invention can be provided as a ready-for-use product in the form of aqueous solutions and dispersions, oil solutions and dispersions, emulsions, aerosol preparations and the like or as a concentrate. The concentrate can be used as is, for example as an additive for paint, or can be diluted prior to use with additional solvents or suspending agents.

When the compositions are supplied as a concentrate with the active ingredients dissolved or dispersed in a liquid vehicle or carrier material, the active biocidal ingredient or mixture of ingredients typically comprises from about 0.1% by weight up to about 80% by weight of the total composition. After formulation as a paint, the preparation typically will contain from about 0.1% by weight up to about 40% by weight, more generally from about 1.0% to about 20% by weight, and most often about 1% to about 10% by weight of the active ingredient or mixture of active ingredients. A liquid vehicle normally comprises more than about 70% by weight, and more generally above about 90% by weight of the composition when it is formulated as a paint. In some concentrates, however, the liquid vehicle can constitute as little as 5% by weight of the composition.

The liquid vehicle is not a critical aspect of the present invention and any liquid which does not interfere with the biocidal activities of the active ingredient and which is compatible with the disclosed applications potentially can be used in the present invention. Suitable materials for the liquid vehicle include water and organic solvents including aliphatic hydrocarbons, aromatic hydrocarbons, such as xylene, toluene, mixtures of aliphatic and aromatic hydrocarbons having boiling points between 100° and 320° C., preferably between 150° and 230° C.; high aromatic petroleum distillates, e.g., solvent naphtha, distilled tar oil and mixtures thereof; alcohols such as butanol, octanol and glycols; vegetable and mineral oils; ketones such as acetone; petroleum fractions such as mineral spirits and kerosene, chlorinated hydrocarbons, glycol esters, glycol ester ethers, and the like. The liquid vehicle may contain at least one polar solvent, such as water, in admixture with an oily or oil-like low-volatility organic solvent, such as the mixture of aromatic and aliphatic solvents found in white spirits, also commonly called mineral spirits.

The liquid vehicle also may commonly include an emulsifier, a wetting agent, a dispersing agent or other surface active agent. Examples of suitable emulsifiers are the nonylphenol-ethylene oxide ethers, and polyoxyethylene sorbitol esters or polyoxyethylene sorbitan esters of fatty acids. For example, a useful formulation may contain the mixture of the active biocidal constituents dissolved in an organic solvent such as mineral spirits which in turn is emulsified with the aid of a suitable emulsifier in water as the primary liquid vehicle.

An aerosol preparation according to the invention is obtained in the usual manner by incorporating the active ingredients dissolved or suspended in a suitable solvent, in a volatile liquid suitable for use as a propellant, for example the mixture of chlorine and fluorine derivatives of methane and ethane commercially available under the trademark "Freon", or compressed air.

The balance of the compositions may include additional ingredients known to be useful in preservatives and coatings for aquatic applications and related products. Such ingredients include fixatives such as carboxymethylcellulose, polyvinyl alcohol, a paraffin and the like, co-solvents, such as ethylglycol acetate and methoxypropyl acetate and plasticizers such as benzoic acid esters and phthlates, e.g., dibutyl phthalate, dioctyl phthalate and didodecyl phthalate. Optionally dyes, color pigments, corrosion inhibitors, chemical stabilizers or siccatives (dryers) such as cobalt octate and cobalt naphthenate also may be included depending on specific applications.

Such additional ingredients are not essential to the practice of the present invention but are included in particular formulations to optimize overall effectiveness and ease of application. The specific examples of suitable constituents for specific preparations as enumerated above are not meant to be limiting and a wide variety of other possible ingredients will be recognized by those skilled in the art. Similarly, the quantity of such additional ingredients in any formulation is not critical. They generally can be used in an amount conventionally employed for products designed to be used in applications for protecting materials exposed to an aquatic environment. Normally, the totally formulated composition may contain from about 0.1% to 95% by weight, and more usually from about 1% to 50% by weight of these additional ingredients on a total solids basis.

Biocidal compositions of the present invention can be applied by any of the techniques known in the art including brushing, spraying, roll coating, dipping and the like. Generally, to obtain effective treatment, it should be sufficient to apply the composition in an amount to provide between about 20 to 180 grams of the active ingredient or mixture of active ingredients per square meter of surface area to be treated (about 0.0040 to 0.037 pound per square foot), with an amount of about 80 to 120 g/$m^2$ (about 0.016 to 0.025 lb/$ft^2$) being more typical. Of course, higher rates of application can be used if desired.

Compositions of the present invention can be prepared simply by mixing the various ingredients at a temperature at which they are not adversely affected, e.g., at a temperature of from about −5° C. to 80° C., preferably at a temperature of from about −10° C. to 45° C. and at a pressure of 450 mmHg to 900 mmHg, preferably at about 650 mmHg to 850 mmHg. Preparation conditions are not critical. Equipment and methods conventionally employed in the manufacture of paint and similar compositions can be advantageously employed.

In preliminary tests over a period of 7.5 weeks during the summer, which is a high growing season for marine organisms, test panels were coated with a representative paint used as a base for preparing anti-fouling paints and were placed in seawater. The base paint was mixed with the individual compounds listed in the table below up to a concentration of 10 wt. %. The individual test results are listed in the following table:

| Compound | Use Level | 4 Weeks | 6 Weeks | 7.5 Weeks |
|---|---|---|---|---|
| TBTO | 10% | clean | clean | m. growth |
| TBTF | 10% | clean | clean | m. growth |
| IPBC | 10% | clean | sl. growth | h. growth |
| IPCC | 10% | clean | sl. growth | h. growth |
| IPPhC | 10% | clean | sl. growth | h. growth |
| IP Benzyl C | 10% | clean | sl. growth | h. growth |
| TBTO/IPBC | 5% + 5% | clean | clean | clean |
| TBTO/IPBC | 3.5% + 6.5% | clean | clean | clean |
| TBTO/IPBC | 3.5% + 3.5% | clean | clean | clean |
| TBTO/IPBC | 2% + 8% | clean | m. growth | sl. growth |
| TBTO/IPBC | 8% + 2% | clean | clean | m. growth |
| TBTO/IPBC | 6.5% + 3.5% | clean | clean | clean |

Note: m = moderate, sl = slight, h = heavy

The table shows slight to heavy growth for IPBC and its derivatives, as well as moderate to slight growth for the tributyltin derivatives used at a concentration of 10 wt. % in the paint composition. After 7.5 weeks, however, in all instances the individual biocides showed signs of failure at use levels of 10 wt. %.

Surprisingly, the synergistic combination of the present invention showed a superior efficacy when used in the same total amount. Suitable points can be made up using a ratio of 1 wt. % TBTO and 10 wt. % IPBC up to 10 wt. % TBTO and 1 wt. % IPBC. Primarily, when IPBC and TBTO were used in a ratio of 1:4 to 4:1 the mixture showed excellent performance with an optimum close to a ratio of 1:1 by weight.

With a second test series the ratio of 1:4 to 4:1 was evaluated in decreasing total amount of the sum of both biocides. Even at a total of 7% of active ingredient preferably in the ratio of 1:1 added to a standard coating (paint) for ship bottoms, the 7.5 week test period continued to indicate superior activity, in comparison to TBTO at a higher level. These experiments clearly show that the combination of IPBC and TBTO is more effective than IPBC or TBTO applied on their own as anti-fouling biocides, indicating a synergistic effect.

Preferably, the two components are premixed before use to form a concentrate in the ratio of 1:4 to 4:1 in a concentration up to a total of 80% dissolved in suitable auxiliary solvents like Xylol or the like to provide easy and homogeneous distribution in the paint, which is intended to perform as an anti-fouling coating.

The following examples are illustrative of compositions according to the present invention and are not intended to be limiting.

EXAMPLE 1

| | |
|---|---|
| 3-iodo-2-propynyl butyl carbamate | 5% |
| tributyltin oxide | 5% |
| auxiliary solvents | 3.3% |
| vinyl acrylic paint | 86.7% |

EXAMPLE 2

| | |
|---|---|
| 3-iodo-2-propynyl butyl carbamate | 4% |
| bis (tributyltin) oxide | 5% |
| auxiliary solvent | 4% |
| vinyl acrylic copolymer paint | 87% |

EXAMPLE 3

| | |
|---|---|
| 3-iodo-2-propynyl butyl carbamate | 3.5% |
| bis (tributyltin) oxide | 3.5% |
| auxiliary solvent | 3.0% |
| vinyl acrylic paint | 90.0% |

EXAMPLE 4

| | |
|---|---|
| 3-iodo-2-propynyl butyl carbamate | 6% |
| bis (tributyltin) oxide | 3.5% |
| auxiliary solvent | 3.3% |
| vinyl acrylic copolymer paint | 87.2% |

EXAMPLE 5

| | |
|---|---|
| 3-iodo-2-propynyl butyl carbamate | 4% |
| bis (tributyltin) oxide | 4% |
| auxiliary solvent | 4% |
| oil based alkyd resin paint | 88.0% |

EXAMPLE 6

| | |
|---|---|
| 3-iodo-2-propynyl butyl carbamate | 5.0% |
| bis (tributyltin) oxide | 5.0% |
| auxiliary solvent | 4.0% |
| pigments | 10.0% |
| epoxy based paint | 76.0% |

EXAMPLE 7

| | |
|---|---|
| 3-iodo-2-propynyl butyl carbamate | 4.0% |
| bis (tributyltin) oxide | 6.0% |
| auxiliary solvent | 3.0% |
| pigments | 10.0% |
| chlorinated rubber based paint | 77.0% |

EXAMPLE 8

| | |
|---|---|
| 3-iodo-2-propynyl butyl carbamate | 5.0% |
| bis (tributyltin) oxide | 5.0% |
| auxiliary solvents | 5.0% |
| acrylic based paint | 85.0% |

EXAMPLE 9

| | |
|---|---|
| 3-iodo-2-propynyl butyl carbamate | 6.0% |
| tributyltin oxide | 4.0% |
| auxiliary solvent | 6.0% |

| -continued | |
|---|---|
| urethane based paint | 84.0% |

While certain specific embodiments of the invention have been described with particularity herein, it will be recognized that various modifications thereof will occur to those skilled in the art and it is to be understood that such modifications and variations are to be included within the purview of this application and the spirit and scope of the appended claims.

I claim:

1. A method for retarding fouling of an underwater surface of a marine structure by marine pests which comprises applying a coating of a paint to said surface, said paint containing a biocidally effective amount of 3-iodo-2-propynyl propyl carbamate, 4-iodo-3-butynyl propyl carbamate and mixtures thereof in admixture with a solvent and a binder.

2. A method for retarding fouling of an underwater surface of a marine structure by marine pests which comprises applying a coating of a paint to said surface, said paint containing a biocidally effective amount of 3-iodo-2-propynyl propyl carbamate in admixture with a solvent and a binder.

3. A method for retarding fouling of an underwater surface of a marine structure by marine pests which comprises applying a coating of a paint to said surface, said paint containing a biocidally effective amount of 4-iodo-3-butynyl propyl carbamate in admixture with a solvent and a binder.

* * * * *